(12) United States Patent
Umehara

(10) Patent No.: US 8,790,419 B2
(45) Date of Patent: Jul. 29, 2014

(54) CELL SEPARATOR COMPRISING PROTECTIVE LAYER MANUFACTURING METHOD

(75) Inventor: Masakazu Umehara, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 317 days.

(21) Appl. No.: 13/264,031

(22) PCT Filed: May 8, 2009

(86) PCT No.: PCT/JP2009/058656
§ 371 (c)(1),
(2), (4) Date: Oct. 12, 2011

(87) PCT Pub. No.: WO2010/128548
PCT Pub. Date: Nov. 11, 2010

(65) Prior Publication Data
US 2012/0100411 A1 Apr. 26, 2012

(51) Int. Cl.
*H01M 2/16* (2006.01)
*B60K 1/04* (2006.01)
*B05D 5/12* (2006.01)

(52) U.S. Cl.
USPC .......... 29/623.5; 429/134; 429/142; 429/251; 427/77

(58) Field of Classification Search
USPC ............ 429/144, 210, 247, 1, 248, 129, 142, 429/251, 134; 427/77; 29/623.1, 623.2, 29/623.5
See application file for complete search history.

(56) References Cited

U.S. PATENT DOCUMENTS

| 3,713,890 | A | * | 1/1973 | Smatko et al. | 429/252 |
| 2001/0000485 | A1 | * | 4/2001 | Ying et al. | 429/228 |
| 2004/0161667 | A1 | * | 8/2004 | Fukuzawa et al. | 429/210 |
| 2005/0208383 | A1 | * | 9/2005 | Totsuka et al. | 429/247 |

(Continued)

FOREIGN PATENT DOCUMENTS

| CN | 101281961 | 10/2008 | |
| GB | 412634 | * 7/1934 | C08C 19/00 |

(Continued)

OTHER PUBLICATIONS

Machine Translation of: Katayama et al. (JP 2008/004442 A), Jan. 10, 2008.*

(Continued)

*Primary Examiner* — Kenneth Douyette
(74) *Attorney, Agent, or Firm* — Finnegan, Henderson, Farabow, Garrett & Dunner, LLP

(57) ABSTRACT

The present invention provides a method of manufacturing a cell separator in which a protective layer mainly composed of at least one type of granular ceramic is formed on a surface of a porous sheet base material. The method includes preparation of a water-based paste obtained by mixing a solid material containing the granular ceramic and a binder with an aqueous solvent to which at least one type of alcohol has been added, and formation of a protective layer in a state in which the alcohol has been eliminated by coating the prepared water-based paste onto a surface of the porous sheet base material, and further includes formation of the protective layer so that the solids content in the protective layer is higher than the solids content in the water-based paste by an amount of elimination of the alcohol, and is at least 55% by mass.

8 Claims, 4 Drawing Sheets

(56) References Cited

U.S. PATENT DOCUMENTS

| | | |
|---|---|---|
| 2006/0024569 A1 | 2/2006 | Hennige et al. |
| 2008/0274410 A1 | 11/2008 | Baba et al. |
| 2009/0067119 A1 | 3/2009 | Katayama et al. |
| 2010/0015530 A1 | 1/2010 | Katayama et al. |
| 2011/0039145 A1 | 2/2011 | Abe et al. |

FOREIGN PATENT DOCUMENTS

| | | |
|---|---|---|
| JP | 6-196199 | 7/1994 |
| JP | 2005-276503 | 10/2005 |
| JP | 2005-536857 | 12/2005 |
| JP | 2008-4442 | 1/2008 |
| JP | 2008-179903 | 8/2008 |
| JP | 2008-210782 | 9/2008 |
| JP | 2008-243660 | 10/2008 |
| JP | 2008-305783 | 12/2008 |
| JP | 2009-032677 | 2/2009 |
| WO | WO 2007/066768 | 6/2007 |
| WO | WO 2008/114727 | 9/2008 |

OTHER PUBLICATIONS

International Search Report in International Application No. PCT/JP2009/058656; Mailing Date: Aug. 11, 2009.

* cited by examiner

CELL SEPARATOR COMPRISING PROTECTIVE LAYER MANUFACTURING METHOD

CROSS-REFERENCE TO RELATED APPLICATIONS

This application is a national phase application of International Application No. PCT/JP2009/058656, filed May 8, 2009, the contents of which are incorporated herein by reference.

TECHNICAL FIELD

The present invention relates to a cell separator in which a protective layer mainly composed of ceramic is formed on a surface of a porous sheet base material, and to a manufacturing method thereof.

BACKGROUND ART

In recent years, secondary batteries such as lithium secondary batteries and nickel hydrogen batteries have become increasingly important as power supplies for mounting in vehicles using electricity as a driving source or as power supplies installed in personal computers, portable terminals and other electrical products. In particular, lithium secondary batteries, which are light weight and allowing the obtaining of high energy density, are expected to be preferably used as high-output power supplies for vehicle mounting.

In a typical configuration of this type of secondary battery, electrodes (positive electrode and negative electrode), which are provided with electrode active material layers (and more specifically, a positive electrode active material layer and a negative electrode active material layer) able to reversibly occlude and release a chemical species capable of functioning as a charge carrier on a surface of an electrode current collector, are laminated with a separator interposed there between. The separator that is interposed between the electrodes is a constituent material of the battery that prevents short-circuiting between both of the electrodes and is able to function as a conductive path (electrically conductive pathway) by being impregnated with an electrolyte.

For example, a porous sheet composed of a synthetic resin in the manner of a polyolefin-based thermoplastic resin is used as a separator of lithium secondary batteries. In addition, a separator is known in which an insulating layer is formed on a surface of the porous sheet to prevent the resin porous sheet from being damaged by heat when the battery generates an abnormally high amount of heat or to prevent the occurrence of short-circuiting due to the occurrence of lithium metal deposition (dendrites).

This insulating layer is formed by coating a paste prepared by mixing a solid material containing an insulating granular material with a suitable solvent (including that in the form of a slurry, and to apply similarly hereinafter) onto a surface of the above-mentioned porous sheet. An aqueous solvent may be used for the solvent that is mixed when preparing the paste. Pastes obtained by using an aqueous solvent have the advantage of producing lower levels of industrial waste accompanying use of organic solvents in comparison with pastes obtained by using organic solvents, while also not increasing equipment and treatment costs as a result thereof, thereby resulting in an overall decrease in the burden on the environment.

Examples of the prior art relating to this type of separator are described in Patent Documents 1 to 3. The technology described in Patent Document 1 suppresses internal short-circuiting caused by dendrite formation by constructing a secondary battery provided with a metal oxide film having a multilayered structure in a portion of a separator. The metal oxide film is formed by mixing a sol solution, in which fine particles of metal oxide are dispersed in a colloidal state in a solvent such as water or alcohol, with an amphiphilic dispersion of an ammonium compound and the like, spreading the resulting dispersion onto a separator and drying. In addition, Patent Document 2 discloses a technology for forming an insulating particle layer by coating a paste containing insulating particles mixed with a solvent such as water or alcohol onto a surface of an insulating base material, followed by drying and peeling off the coated film. Moreover, in Patent Document 3, a technology is disclosed in which a ceramic coating is provided on a non-woven fabric composed of non-conductive polymer fibers, and the ceramic coating is formed by coating a suspension containing a non-conductive oxide having for constituent elements thereof, Al, Zr and/or Si onto a base material.

Patent Document 1: Japanese Patent Application Laid-open No. H6-196199
Patent Document 2: Japanese Patent Application Laid-open No. 2005-276503
Patent Document 3: Japanese Patent Application Laid-open No. 2005-536857

DISCLOSURE OF THE INVENTION

However, since a surface of the above-mentioned synthetic resin porous sheet (separator base material) is demonstrates water repellency overall, there are cases in which the water-based paste is not properly coated. Various measures have been contrived to deal with this, examples of which include a method for improving wettability by modifying the surface of the separator base material with corona discharge or plasma treatment, and a method for increasing paste viscosity by mixing with an additive (such as an alcohol) when preparing the paste. However, in methods involving treating the surface of the base material with corona discharge treatment and the like, treatment unevenness occurs or there is the risk of damaging the base material by etching damage. In addition, although pastes in which viscosity has been increased by adding an additive are less likely to be repelled from the separator base material surface, leveling (performance yielding uniform coating) decreases resulting in the risk of poor adhesion (patchiness) of the paste on a portion of the base material surface.

Therefore, the present invention was conceived in order to solve the problems of the prior art relating to a water-repellent separator of a porous sheet made of synthetic resin as previously described, and an object thereof is to provide a manufacturing method of a cell separator that has an insulating layer (to also be referred to as a "protective layer") mainly composed of a ceramic on a surface of a water-repellent separator base material that enables a water-based paste to be coated onto a surface of the separator base material without demonstrating patchiness or unevenness. In addition, another object is to provide a secondary battery provided with a separator manufactured using this manufacturing method, and a vehicle provided with that secondary battery.

In order to realize the above-mentioned objects, the present invention provides a method of manufacturing a cell separator in which a protective layer mainly composed of at least one type of granular ceramic is formed on a surface of a porous sheet base material. The cell separator manufacturing method according to the present invention includes preparing a water-based paste obtained by mixing a solid material containing the granular ceramic and at least one type of binder that is soluble or dispersible in an aqueous solvent, with an aqueous solvent to which at least one type of alcohol has been added, and forming a protective layer in a state in which the alcohol has been eliminated (typically by considering evaporating into the atmosphere or permeating into the porous sheet base material) by coating the prepared water-based paste onto at least one surface of the porous sheet base material. In addition, the manufacturing method includes forming the protective layer using a water-based paste for which the solids content in the water-based paste has been adjusted so that the solids content in the protective layer is higher than the solids content in the water-based paste by an amount of elimination of the alcohol (typically evaporation into the atmosphere or permeation into the porous sheet base material), and so that the solids content in the protective layer is at least 55% by mass.

Furthermore, in the present specification, "separator" refers to a sheet interposed between a positive electrode (and typically, a positive electrode sheet) and a negative electrode (and typically, a negative electrode sheet), and is a constituent material of a secondary battery that fulfills roles of preventing short-circuiting accompanying contact between both the electrodes and forming a conductive path (electrically conductive pathway) between the electrodes.

In addition, in the present specification, "secondary battery" refers in general to an electrical storage device capable of being repeatedly charged, and includes so-called storage batteries such as a lithium secondary battery (and typically, a lithium ion battery), nickel hydrogen battery or nickel cadmium battery, as well as electrical storage elements (physical cells) such as an electric double-layer capacitor.

In the cell separator manufacturing method provided by the present invention, a cell separator can be provided in which an insulating layer mainly composed of at least one type of granular ceramic (such as alumina particles) is formed on a surface of a porous sheet base material. In this type of separator provided with an insulating layer, a large content of solid material (non-volatile components excluding solvent) in the protective layer (of at least 55% by mass, or 55% by mass or more, and typically 55% by mass to 60% by mass, e.g. 55% by mass) makes it possible to inhibit repulsion of a water-based paste coated onto a surface of a water-repellent porous sheet (such as a polyolefin-based synthetic resin film) from the sheet. However, if the water-based paste is prepared to have a high solids content in advance, leveling (performance yielding uniform coating) decreases due to increased viscosity, thereby resulting in increased susceptibility to the occurrence of patchiness (portions where the amount of adhered water-based paste is inadequate). In addition, it becomes difficult to form the protective layer to have a thin, uniform layer thickness, and there is the risk of increased internal resistance of a battery constructed using this separator.

Therefore, in the present invention, in preparing the water-based paste, the water-based paste is first prepared so that the solids content thereof is reduced by using an aqueous solution to which at least one type of alcohol has been added. As a result, leveling of the water-based paste that has been adjusted to a suitable viscosity on the above-mentioned base material is improved, and the paste can be coated onto a surface of a porous sheet base material uniformly and thinly without becoming patchy.

In addition, since alcohol added to the water-based paste is eliminated (typically by evaporating into the atmosphere or permeating into the porous sheet base material) simultaneous to coating the water-based paste onto the porous sheet base material (or residual alcohol when drying the paste), the solids content in the protective layer can be increased by the amount of alcohol that is eliminated. Thus, by preliminarily adding alcohol to the aqueous solvent, the solids content in the protective layer following elimination of the alcohol is increased, and a formation of a protective layer is realized so as to have a desired solids content (of at least 55% by mass, or 55% by mass or more, and typically 55% by mass to 60% by mass, e.g. 55% by mass). As a result, a high-quality cell separator can be manufactured in which a protective layer is formed that is resistant to peeling from the porous sheet base material and has a uniform layer thickness.

In addition, in a preferable aspect of the cell separator manufacturing method provided by the present invention, a protective layer is formed using a water-based paste for which the solids content in the water-based paste has been adjusted to 44% by mass to 52% by mass.

Preparing the water-based paste so that the solids content in the water-based paste is 44% by mass to 52% by mass makes it possible to improve leveling of the water-based paste with respect to the base material, thereby enabling the water-based paste to be uniformly coated over the entire surface of the porous sheet base material. In addition, since alcohol present in the water-based paste is eliminated during coating (or residual alcohol is eliminated when drying the paste) as a result of evaporating into the atmosphere or permeating into pores (voids) of the base material, the solids content in the protective layer can be increased by the amount of alcohol that is eliminated. As a result, the formation of a protective layer is realized in which the solids content is at least 55% by mass. As a result, a high-quality cell separator can be manufactured in which a protective layer is formed that is resistant to peeling from the porous sheet base material and has a thin, uniform layer thickness.

In addition, in another preferable aspect, an aqueous solvent for which the ratio of the alcohol contained in the aqueous solvent has been adjusted to 11% by mass to 36% by mass is used for the aqueous solvent. In addition, a material that dissolves in water and is eliminated at a temperature lower than that of water is preferably used for the alcohol.

Leveling during coating is improved to a greater degree the lower the solids content in the water-based paste. However, if too much alcohol is added, the alcohol in the water-based paste is eliminated prior to coating, thereby resulting in the risk of the solid material precipitating. Therefore, in a preferable aspect of the present invention, the solid material is prevented from precipitating before coating by preparing the water-based paste so that the solids content in the water-based paste is 44% by mass to 52% by mass by using an aqueous solvent in which the alcohol ratio has been adjusted to 11% by mass to 36% by mass. As a result, a high-quality cell separator can be manufactured in which a protective layer is formed that is resistant to peeling from the porous sheet base material and has uniform layer thickness.

In still another preferable aspect, the water-based paste is coated onto the porous sheet base material using a gravure coating method. The gravure coating method refers to a method in which a gravure roller engraved with surface irregularities in a surface thereof is immersed in a liquid layer, and a coating liquid (here, the water-based paste) adhered to the surface irregularities in the surface is spread out with a blade while filling liquid into concave portions of the surface irregularities to transfer the coating liquid to the porous sheet base material. The use of this coating method makes it possible to coat the water-based paste prepared in the manner described above to an extremely thin thickness (of roughly 40 μm or less and preferably 10 μm or less) on at least one surface of the porous sheet base material. As a result, a high-quality cell separator can be manufactured in which is formed a protective layer having a thin, uniform layer thickness.

In addition, a material composed of at least one layer of a polyolefin-based synthetic resin is preferably used for the porous sheet base material. Since a porous sheet composed of a polyolefin-based synthetic resin demonstrates high liquid retention and allows a large number of pores (voids) to be impregnated with an electrolyte solution, it can function as a migration pathway of a charge carrier.

In addition, in another aspect thereof, the present invention provides a cell separator. Namely, the cell separator provided by the present invention has a protective layer mainly composed of at least one type of granular ceramic formed on a surface of a porous sheet base material. The protective layer contains, as a solid material, the granular ceramic and at least one type of binder that is soluble or dispersible in an aqueous solvent, and the protective layer is formed so that the solids content in the protective layer is at least 55% by mass.

Since the cell separator according to this aspect has a protective layer in which the solids content on a surface of the porous sheet base material has been increased to at least 55% by mass (and typically, 55% by mass to 60% by mass, e.g. 55% by mass), the protective layer is resistant to peeling from the porous sheet base material and short-circuiting attributable to the formation of dendrites on a negative electrode can be prevented. As a result, a high-quality cell separator can be provided that is provided with a protective layer capable of preventing the occurrence of internal short-circuiting.

In addition, in a preferable aspect of the cell separator provided by the present invention, the protective layer has a layer thickness of 10 μm or less. The providing of a protective layer of this layer thickness makes it possible to suppress increases in internal resistance of a battery constructed using this separator.

In addition, according to the present invention, a secondary battery is provided in which any of the cell separators disclosed herein (which can be a cell separator manufactured by any of the methods disclosed herein) is provided between a positive electrode and a negative electrode. Moreover, a vehicle is provided that is provided with the above-mentioned secondary battery. The cell separator provided by the present invention can be that which has a protective layer that is resistant to peeling from a porous sheet base material and is formed to a thin, uniform layer thickness, and which demonstrates high quality (by, for example, suppressing increases in internal resistance and preventing short-circuiting attributable to dendrite formation) suitable for use as a cell separator for a secondary battery required to demonstrate a high rate of charging and discharging when installed in a vehicle as a driving source thereof. Thus, a secondary battery provided with this cell separator can be preferably used as a power supply for a motor installed in a vehicle such as an automobile equipped with a motor in the manner of a hybrid vehicle, electrical vehicle or fuel cell electric vehicle.

BEST MODE FOR CARRYING OUT THE INVENTION

Figure 1:
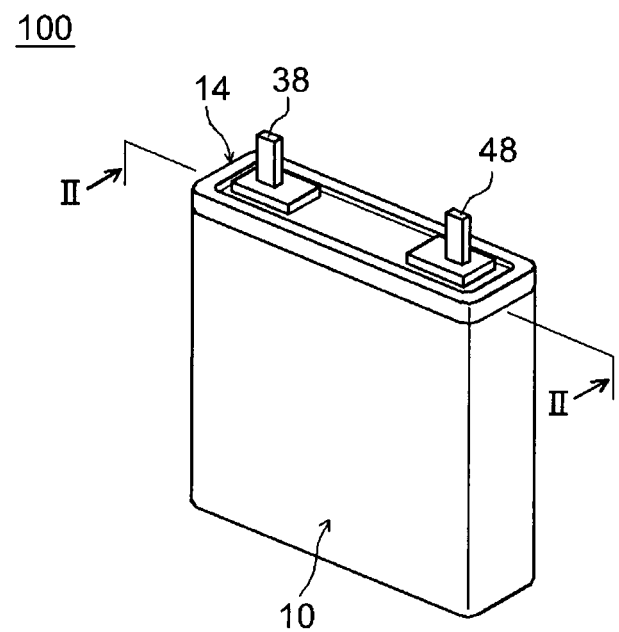
FIG. 1 is a perspective view schematically showing the outer appearance of a lithium secondary battery according to an embodiment.

The following provides an explanation of preferred embodiments of the present invention. Furthermore, those matters required for carrying out the present invention other than matters specifically mentioned in the present description can be understood to be design matters for a person with ordinary skill in the art based on the prior art in the relevant field. The present invention can be carried out based on the contents disclosed in the present description and common general technical knowledge in the relevant field.

The cell separator disclosed herein is provided with a configuration in which a protective layer mainly composed of at least one type of granular ceramic is formed on a surface of a porous sheet base material. This cell separator is manufactured by preparing a water-based paste, obtained by mixing a solid material containing the granular ceramic and at least one type of binder that is soluble or dispersible in an aqueous solvent, with an aqueous solvent to which at least one type of alcohol is added, and forming a protective layer from which the alcohol has been eliminated (and typically, evaporated) by coating the prepared water-based paste onto at least one surface of the porous sheet base material.

Although the following provides a detailed explanation of the cell separator and cell separator manufacturing method disclosed herein by using as an example a lithium secondary battery (and typically, a lithium ion battery) provided with a cell separator manufacturing using this manufacturing method, the present invention is not limited to this embodiment.

Furthermore, in the following drawings, those members or sites that demonstrate the same actions are indicated with the same reference symbols, and duplicate explanations thereof are omitted or simplified. In addition, dimensional relationships in the drawings (such as length, width or thickness) do not reflect actual dimensional relationships.

FIG. 1 is a perspective view schematically showing a prismatic lithium secondary battery 100 according to an embodiment. In addition, FIG. 2 is a cross-sectional view taken along line II-II in FIG. 1, while FIG. 3 is a cross-sectional view schematically showing a portion of a laminated portion of a positive electrode sheet 30, a negative electrode sheet 40 and a separator 50 composing a wound-type electrode body 20.

As shown in FIG. 1, the lithium secondary battery 100 according to the present embodiment is provided with a rectangular prismatic case 10, and a cover 14 that covers an opening 12 of the case 10. A flat electrode body (the wound-type electrode body 20) and an electrolyte solution can be housed within the battery case 10 by this opening 12. In addition, a positive electrode terminal 38 and a negative electrode terminal 48 for external connection are provided on the cover 14, and portions of these terminals 38 and 48 protrude from the surface of the cover 14.

Figure 2:
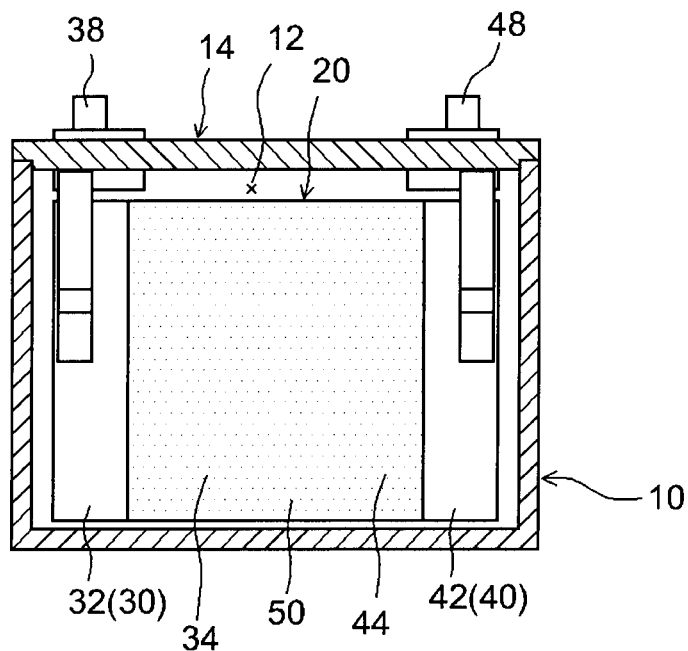
FIG. 2 is a longitudinal cross-sectional view taken along line II-II in FIG. 1.
Figure 3:
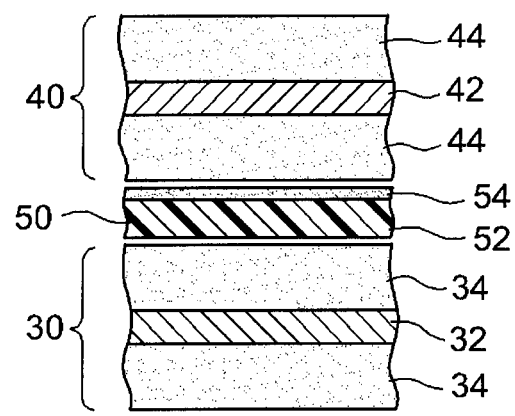
FIG. 3 is a cross-sectional view showing a positive electrode, negative electrode and a separator that compose a wound-type electrode body according to an embodiment.

As shown in FIGS. 2 and 3, the wound-type electrode body 20 is housed within the case 10 in the present embodiment. The electrode body 20 is composed of the positive electrode 30, in which a positive electrode active material layer 34 is formed on a surface of an electrode body current collector 32 in the form of a long sheet, the negative electrode 40, in which a negative electrode active material layer 44 is formed on a surface of a negative electrode current collector 42 in the form of a long sheet, and the cell separator 50, in which the protective layer 54 composed of a granular ceramic is formed on a surface of a porous sheet 52 in the form of a long sheet. The positive electrode sheet 30 and the negative electrode sheet 40 are wound by superimposing with the separator 50, and the resulting wound-type electrode body 20 is formed into a flat shape by crushing by pressing from the sides. Namely, as shown in FIG. 3, the separator 50 disclosed herein is arranged so as to respectively contact the negative electrode active material layer 34 of the positive electrode sheet 30 and the negative electrode active material layer 44 of the negative electrode sheet 40. In addition, although there are no particular limitations thereon, in the case the protective layer 54 of the separator 50 is formed on only one side of the porous sheet 52, the protective layer 54 is preferably arranged so as to oppose the negative electrode active material layer 44 to prevent internal short-circuiting attributable to dendrite formation on the negative electrode side.

In addition, in the wound positive electrode sheet 30, the positive electrode current collector 32 is exposed on one end along the lengthwise direction thereof where the positive electrode active material layer 34 is not formed, while on the other hand, in the wound negative electrode sheet 40 as well, the negative electrode current collector 42 is exposed on one end along the lengthwise direction thereof where the negative electrode active material layer 44 is not formed. The positive electrode terminal 38 is joined to the exposed end of the positive electrode current collector 32, the negative electrode terminal 48 is joined to the exposed end of the negative electrode current collector 42, and are electrically connected to the positive electrode sheet 30 or the negative electrode sheet 40 of the wound-type electrode body 20 formed into a flat shape as described above. The positive and negative electrode terminals 38 and 48 and the positive and negative electrode current collectors 32 and 42 can be respectively joined by, for example, ultrasonic welding or resistance welding.

First, an explanation is provided of each constituent of the cell separator 50 disclosed herein. The separator 50 is a sheet interposed between a positive electrode (and typically, the positive electrode sheet 30) and a negative electrode (and typically, the negative electrode sheet 40), and is a constituent material of a secondary battery that fulfills the role of preventing short-circuiting accompanying contact between both electrodes and forming a conductive path (electrically conductive pathway) between the electrodes. The separator 50 disclosed herein is provided with the protective layer 54 mainly composed of at least one type of granular ceramic formed on a surface of the porous sheet 52 base material.

A material composed of a polyolefin-based synthetic resin is preferably used for the constituent material of the porous sheet 52 serving as a base material of the separator 50. Examples of porous polyolefin-based synthetic resins include polypropylene, polyethylene and polystyrene. Since a porous sheet composed of such a polyolefin-based synthetic resin demonstrates high liquid retention and enables an electrolyte solution to permeate into the large number of pores (voids) thereof, it can function as a migration pathway of a charge carrier. Moreover, a material in which the polyolefin-based synthetic resin has a laminated structure of at least one layer (bilayer structure, trilayer structure or multilayer structure) can also be used for the porous sheet 52 base material. An example of such a porous sheet is a porous multilayer sheet obtained by laminating sheets of different synthetic resins such as polypropylene or polyethylene.

In addition, a film or membrane having a large number of fine pores (with a pore diameter of, for example, 1 μm or less, and typically about several tens of nm) is preferable for the material of the porous sheet. In the cell separator manufacturing method disclosed herein, since the protective layer 54 having a layer thickness of roughly 40 μm or less and preferably 10 μm or less is formed on a surface of the porous sheet 52, if the size of the pores is larger than the layer thickness of the protective layer 54 in the manner of a base material that uses a non-woven fabric and the like, when coating the water-based paste, the paste ends up entering the pores and becomes patchy (formation of portions where inadequate amounts of the water-based paste are adhered), thereby making it difficult to uniformly coat the water-based paste onto a surface of the porous sheet 52 base material. However, in the case of the porous sheet 52 composed of a film or membrane having a large number of fine pores, patchiness does not occur even if the water-based paste enters a portion containing the fine pores, thereby enabling it to be preferably used as a material that composes the separator 50.

The solid material that composes the protective layer 54 formed on a surface of the porous sheet 52 base material contains at least one type of granular ceramic and at least one type of binder that is soluble or dispersible in an aqueous solvent.

In the solid material that composes the protective layer 54, granules composed of a non-conducting inorganic compound (ceramic granules) can be used preferably for the granular ceramic serving as the main component. Examples of the inorganic compounds include oxides, carbides, silicides and nitrides of metal elements or non-metal elements. From the viewpoints of chemical stability, raw material cost and the like, inorganic oxides composed of oxide granules such as alumina ($Al_2O_3$), silica ($SiO_2$), zirconia ($ZrO_2$) or magnesia (MgO) can be used preferably. In addition, inorganic silicides composed of silicide granules such as silicon carbide (SiC) or inorganic nitrides composed of nitride particles such as aluminum nitride (AlN) can also be used. Aluminum granules (e.g. α-alumina particles) are particularly preferable for the granular ceramic. Alumina particles can be particles having a form in which a plurality of primary granules is linked together. Such linked granules can be produced based on common general technical knowledge in the relevant field, or equivalent commercially available products can be acquired.

In addition, at least one type of binder that is soluble or dispersible in an aqueous solvent is used as a solid material that composes the protective layer 54.

A water-soluble polymer or water-dispersible polymer can be used for the binder that is soluble or dispersible in an aqueous solvent. Examples of binders that dissolve in an aqueous solvent include various cellulose derivatives such as carboxymethyl cellulose (CMC), methyl cellulose (MC), cellulose acetate phthalate (CAP), hydroxypropyl methylcellulose (HPMC) or hydroxypropyl methylcellulose phthalate (HPMCP).

On the other hand, examples of binders that disperse in an aqueous solvent include polyethylene oxide (PEO), fluorine-based resins such as polytetrafluoroethylene (PTFE), tetrafluoroethylene-perfluoroalkyl vinyl ether copolymer (PFA), tetrafluoroethylene-hexafluoropropylene copolymer (FEP) or ethylene-tetrafluoroethylene copolymer (ETFE), vinyl acetate copolymers, styrene-butadiene block copolymer (SBR), acrylic acid-modified SBR resin (SBR-based latex) and rubbers such as gum arabic. A binder that is used particularly preferably is CMC or PTFE. Furthermore, one type of these binders may be used alone or two or more types may be used in combination. Moreover, the solid material may be used by combining an additive such as a thickener in addition to the binder.

In addition, an aqueous solvent can be used for the solvent that dissolves or disperses the solid material. Although the aqueous solvent is typically water, it is only required to be that which demonstrates aqueous properties overall, and may also be an aqueous solution containing, for example, a lower alcohol (such as methanol or ethanol). Namely, water or a mixed solvent having water as a main component thereof can be preferably used for the solvent for dissolving or dispersing the binder contained in the water-based paste. One type of two or more types of an organic solvent able to uniformly mix with water (such as lower alcohols or lower ketones) can be suitably selected and used as a solvent other than water that composes the mixed solvent. For example, a solvent in which roughly 80% by mass or more (more preferably roughly 90% by mass or more and even more preferably roughly 95% by mass or more) of an aqueous solvent is water is used preferably. A particularly preferable example of a solvent is a solvent essentially composed of water.

A material that dissolves in water and is eliminated at a temperature lower than that of water can be used for the alcohol added to the aqueous solvent. Although there are no particular limitations on the type of alcohol, a lower alcohol such as methanol, ethanol, isopropyl alcohol or ethylene glycol is preferable.

Next, an explanation is provided of the manufacturing method of the cell separator 50 disclosed herein.

As shown in FIG. 3, the separator 50 can be manufactured by forming the protective layer 54 on a surface of the porous sheet 52 base material. In forming the protective layer 54, a water-based paste is first prepared by mixing a granular ceramic and a solid material (non-volatile portion excluding solvent) containing at least one type of binder that is soluble or dispersible in an aqueous solvent, with an aqueous solvent to which at least one type of alcohol has been added. Next, the protective layer 54 can be formed in a state in which the alcohol has been eliminated (and typically, in consideration of evaporating into the atmosphere or permeating into the porous sheet base material) by coating the prepared water-based paste onto at least one surface of the porous sheet 52 base material. The following provides a detailed description of the separator manufacturing method disclosed herein.

In the cell separator manufacturing method disclosed herein, the protective layer 54 is formed using a water-based paste for which the solids content in the water-based paste is adjusted so that the solids content in the protective layer 54 in a state in which the alcohol has been eliminated increases (to at least 55% by mass, or 55% by mass or more, and typically 55% by mass to 60% by mass, e.g. 55% by mass). Namely, although the water-based paste is typically easily repelled and difficult to coat since the porous sheet 52 serving as a base material for the separator is composed with a water-repellent material (such as a film made of a polyolefin-based resin), as a result of increasing the solids content in the water-based paste in this manner, viscosity of the water-based paste can be increased and repellency of the water-based paste with respect to the porous sheet 52 can be inhibited.

On the other hand, if the solids content becomes excessively high, leveling (performance yielding uniform coating) decreases and there is the risk of increased susceptibility to the occurrence of patchiness due to increased viscosity of the water-based paste. Therefore, in the cell separator manufacturing method disclosed herein, during preparation of the water-based paste, the water-based paste is prepared by adding an aqueous solvent containing alcohol so that the solids content in the water-based paste is lower than the solids content in the protective layer 54 (at least 55% by mass, or 55% by mass or more, and typically 55% by mass to 60% by mass, e.g. 55% by mass). For example, the water-based paste is preferably prepared so that the solids content in the water-based paste is 44% by mass to 52% by mass. As a result, simultaneous to coating the water-based paste onto the porous sheet base material (or residual alcohol when drying the paste), the alcohol in the water-based paste is eliminated by either evaporating into the atmosphere or permeating into pores (voids) of the base material, thereby making it possible to increase the solids content in the protective layer 54 by the amount of alcohol that is eliminated. Thus, the protective layer 54 can be formed in which the solids content in the protective layer 54 after the alcohol has been eliminated is increased to at least 55% by mass.

Next, after preparing the water-based paste, the water-based paste is coated onto the porous sheet 52 base material. There are no particular limitations on the coating (application) method provided the water-based paste can be coated to a coated amount (coated thickness) of roughly 40 μm or less and preferably 10 μm or less, and techniques similar to conventionally known methods can be suitably employed. Although examples of such conventionally known methods include coating methods using a coating apparatus such as a slit coater, gravure coater, die coater or comma coater, a gravure coating method can be employed particularly preferably since a gravure coater is used that is capable of controlling the coated amount even when using small coated amounts. In addition, a gravure coating method that uses a kiss reverse method can also be used.

Figure 4:
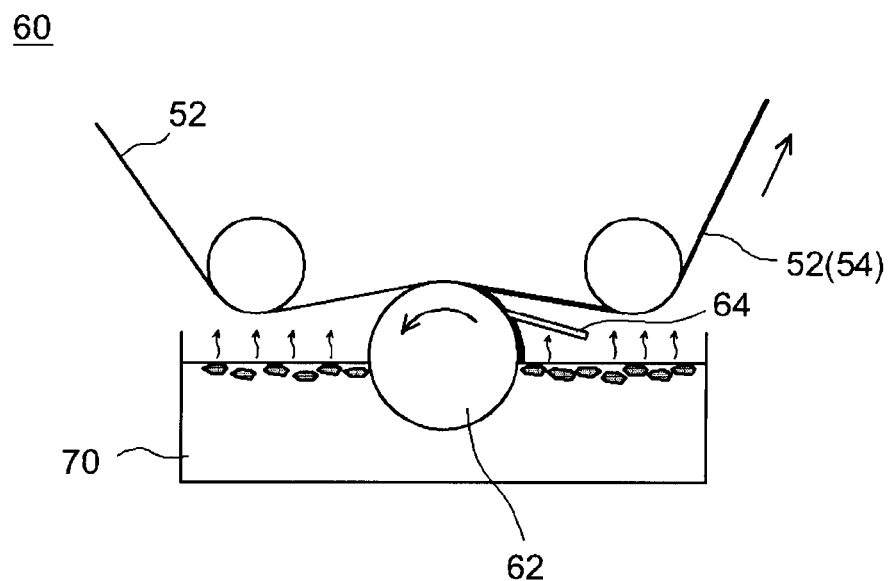
FIG. 4 is a cross-sectional view schematically showing a gravure coater used in a kiss reverse gravure coating method.

FIG. 4 is a cross-sectional view schematically showing a gravure coater 60 using a kiss reverse method.

As shown in FIG. 4, a gravure roller 62, in which surface irregularities are formed by engraving the surface thereof, is arranged in a state in which at least a portion of the surface thereof is immersed in a water-based paste 70 serving as a coating liquid. In addition, the porous sheet 52 base material traveling in the opposite direction from the direction of rotation of the gravure roller 62 is closely adhered to the surface of the gravure roller 62. As a result of rotation of the gravure roller 62, the water-based paste 70 adheres to the surface irregularities in the surface of the gravure roller 62, and surplus water-based paste 70 is scraped off by a blade 64. Thus, the water-based paste 70 accumulates in concave portions of the rotating gravure roller 62, and the protective layer 54 can be formed on at least one side of the porous sheet 52 base material as a result of the accumulated water-based paste 70 being transferred (coated) into concave portions of the porous sheet 52 base material traveling in the opposite direction from the direction of rotation of the gravure roller 62. Furthermore, there are no particular limitations on the coating speed or drying temperature, and commonly used conditions can be suitably selected.

The water-based paste 70 can be coated onto the porous sheet 52 base material using the gravure coater 60 as described above. Here, if an excessive amount of alcohol is added when preparing the water-based paste, as shown in FIG. 4, the alcohol in the water-based paste 70 is eliminated prior to coating, thereby resulting in the risk of solid material precipitating on the surface of the water-based paste 70. Therefore, in the cell separator manufacturing method disclosed herein, an aqueous solvent having an alcohol ratio of 11% by mass to 36% by mass is preferably used as solvent for preparing the water-based paste. Elimination of alcohol prior to coating and precipitation of solid material can be prevented by preparing the water-based paste so that the solids content in the water-based paste is 44% by mass to 52% by mass by using an aqueous solvent to which alcohol has been added at the ratio indicated above. In addition, leveling of the water-based paste with respect to the porous sheet 52 base material demonstrating water repellency can be improved, and the water-based paste can be uniformly coated over the entire surface of the porous sheet 52 base material. As a result, a high-quality cell separator 50 can be manufactured in which the protective layer 54 is formed that is resistant to separation from the porous sheet 52 base material and has a uniform layer thickness.

The lithium secondary battery 100 able to be provided by the present invention may be similar to this type of conventional secondary battery 100 with the exception of providing the separator 50, in which the protective layer 54 mainly composed of at least one type of granular ceramic as previously described is formed on a surface of the porous sheet 52 base material, between the positive electrode 30 and the negative electrode 40, and there are no particular limitations thereon. Although the following provides an explanation of other constituents thereof, this explanation is not intended to limit the present invention to the present embodiment.

The positive electrode 30 can employ a configuration in which, for example, the positive electrode active material layer 34 is formed on the long positive electrode current collector 32 (such as an aluminum foil). One type or two or more types of a material conventionally used in lithium secondary batteries can be used without any particular limitations for the positive electrode active material used to form this positive electrode active material layer 34. For example, a lithium transition metal complex oxide such as a lithium-nickel-based complex oxide, lithium-cobalt-based complex oxide or lithium-manganese-based complex oxide can be preferably used for this material. Furthermore, an olivine-type lithium phosphate represented by the general formula $LiMPO_4$ (wherein, M represents at least one type of element among Co, Ni, Mn and Fe, examples of which include $LiFePO_4$ and $LiMnPO_4$) may also be used for the positive electrode active material.

One type or two or more types of materials incorporated in typical lithium secondary batteries can be contained as necessary in the positive electrode active material 34 in addition to the positive electrode active material described above. Various types of polymer materials able to function as binders as well as electrically conductive materials can be used as such materials. Electrically conductive powder materials such as carbon powder or carbon fiber are preferably used as electrically conductive materials. Examples of these materials include acetylene black, furnace black, ketjen black and graphite powder.

The positive electrode active material layer 34 is preferably produced by adding the positive electrode active material to a suitable solvent (water, organic solvent or mixed solvent thereof) together with an additive such as a binder and/or electrically conductive material, coating a composition in the form of a paste or slurry prepared by dispersing or dissolving onto the positive electrode current collector 32, and then drying the solvent.

In addition, the negative electrode 40 can employ a configuration in which the negative electrode active material layer 44 is formed on the long negative electrode current collector 42 (such as a copper foil). One type or two or more types of substances conventionally used in lithium secondary batteries can be used without any particular limitations for the negative electrode active material capable of occluding and releasing lithium used to form this negative electrode active material layer 44. An example of a preferable negative electrode active material is carbon granules. A granular carbon material (carbon granules) containing a graphite structure (layered structure) in at least a portion thereof is used preferably. Carbon materials having any of a so-called graphitized structure (graphite), non-graphitizable carbon structure (hard carbon), graphitizable carbon structure (soft carbon) or combinations thereof can also be used preferably.

One type or two or more types of materials able to be incorporated in typical lithium secondary batteries can be contained as necessary in the negative electrode active material layer 44 in addition to the negative electrode active material described above. Various types of polymers able to function as a binder like those previously listed as examples of constituent materials of the positive electrode active material layer 34 can be similarly used as such materials.

The negative electrode active material layer 44 can be preferably produced by adding a negative electrode active material to a suitable solvent (water, organic solvent or mixed solvent thereof) together with a binder and the like, coating a composition in the form of a paste or slurry prepared by dispersing or dissolving onto the negative electrode current collector 42, drying the solvent and performing compression.

In addition, an electrolyte solution similar to a non-aqueous electrolyte solution conventionally used in lithium secondary batteries can be used without any particular limitations as an electrolyte solution. This non-aqueous electrolyte solution typically has a composition in which a supporting salt is contained in a suitable non-aqueous solvent. One type or two or more types of non-aqueous solvent selected from the group consisting of propylene carbonate (PC), ethylene carbonate (EC) and diethyl carbonate (DEC) can be used for the non-aqueous solvent. In addition, one type or two or more types of lithium compounds (lithium salts) selected from the group consisting of $LiPF_6$, $LiBF_4$, $LiClO_4$ and $LiAsF_6$ can be used for the supporting salt.

The lithium secondary battery 100 of the present embodiment can be constructed by winding the positive electrode sheet 30 and the negative electrode sheet 40 prepared in the manner described above by superimposing with the separator 50, housing the resulting wound-type electrode body 20 in the battery case 10, and injecting the electrolyte solution described above followed by sealing inside.

Furthermore, there are no particular limitations on the structure, size or materials of the battery case 10 (for example, the battery case 10 can be made from metal or a laminated film), or on the structure and the like (such as a wound structure or layered structure) of the electrode body having the positive and negative electrodes as main constituents thereof.

Although the following provides an explanation of test examples relating to the present invention, this explanation is not intended to limit the present invention to that indicated in these specific examples.

<Manufacturing of Separator>

A cell separator was manufactured according to the procedure described below. Furthermore, a polypropylene/polyethylene/polypropylene film (PP/PE/PP film) having a thickness of 20 μm, air permeability of 300 sec/100 mL and porosity of 45% was used as a porous sheet base material.

Here, "air permeability" refers to permeability resistance (Gurley method) as measured based on JIS P 8117. Typically, it is represented as the amount of time (sec) for 100 mL of air to pass through a target object having a surface area of 642 $mm^2$ (units: sec/100 mL). In addition, "porosity" refers to the ratio of the volume of pores to the total area of a film (%), and is also referred to as void ratio or pore ratio.

First, in order to prepare a water-based paste, a solid material was prepared by mixing α-alumina particles as granular ceramic, and styrene-butadiene rubber (SBR) and carboxymethyl cellulose (CMC) as binders so that the ratio of the weight percentages of these materials was 97:2:1. The solid material was then mixed using ion exchange water to which ethanol had been added so that the solids content in the water-based paste was 36% to 54% to prepare water-based pastes according to samples 1 to 10. Furthermore, the ratio of the added ethanol was adjusted in each of the samples so that the solids content in the protective layer after eliminating the ethanol was 55% by mass.

The solids contents in the water-based pastes of the samples 1 to 10 and the ratios of the ethanol added to the ion exchange water are summarized in Table 1.

TABLE 1

|  | Solids content (mass %) | Ethanol ratio (%) |
| --- | --- | --- |
| Sample 1 | 54 | 4 |
| Sample 2 | 52 | 11 |
| Sample 3 | 50 | 18 |
| Sample 4 | 48 | 24 |
| Sample 5 | 46 | 30 |
| Sample 6 | 44 | 36 |
| Sample 7 | 42 | 41 |
| Sample 8 | 40 | 45 |
| Sample 9 | 38 | 50 |
| Sample 10 | 36 | 54 |

Next, cell separators were manufactured by coating the water-based pastes prepared in the manner described above onto a PP/PE/PP film serving as a porous sheet base material using a kiss reverse type of gravure coater to form protective layers in a state in which the ethanol has been eliminated. Furthermore, the coated amount (coated thickness) was set to 6 μm. The resulting cell separators were observed for the two parameters indicated below.

The first parameter was whether or not patchiness occurred in the water-based paste on the coated surface, while the second parameter was whether or not the ethanol in the water-based paste was eliminated and solid material precipitated on a surface of the water-based paste.

The results of observing the cell separators for these two parameters are summarized in Table 2. In addition, FIG. 5 shows a graph indicating a correlation between solids content in the water-based paste and alcohol addition ratio.

TABLE 2

|  | Coated surface patchiness YES: x, NO: o | Solid material precipitation YES: x, NO: o |
| --- | --- | --- |
| Sample 1 | x | o |
| Sample 2 | o | o |
| Sample 3 | o | o |
| Sample 4 | o | o |
| Sample 5 | o | o |
| Sample 6 | o | o |
| Sample 7 | o | x |
| Sample 8 | o | x |
| Sample 9 | o | x |
| Sample 10 | o | x |

Figure 5:
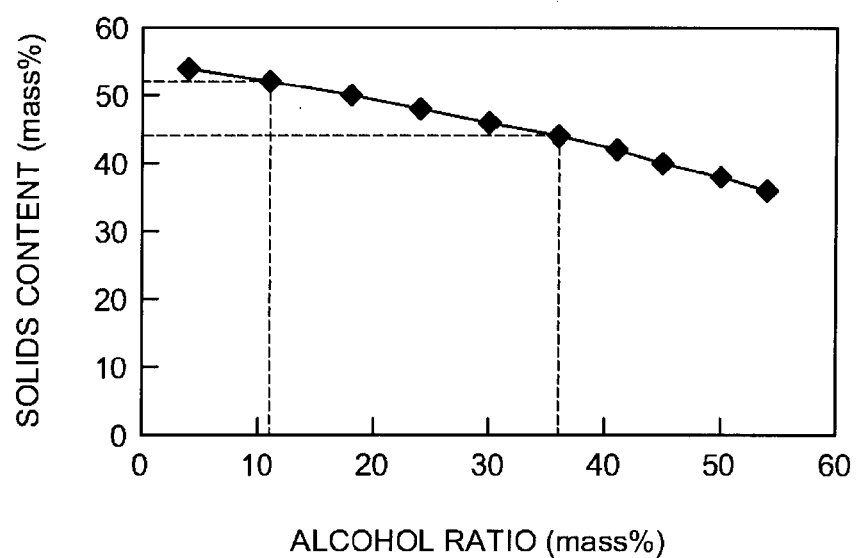
FIG. 5 is a graph indicating a correlation between solids content and alcohol addition ratio in a water-based paste.

As is clear from Table 2 and FIG. 5, except for sample 1 (solids content: 54% by mass, alcohol ratio: 4%), patchiness of the coated surface was not observed in samples 2 to 10. In addition, with the exception of samples 7 to 10 (solids content: 42% by mass or less, alcohol ratio: 41% or more), solid material precipitation was not observed in samples 1 to 6.

In summary of the above, surface patchiness and solid material precipitation were not observed in samples 2 to 6. In samples 2 to 6, solids content was from 44% by mass to 52% by mass, and alcohol ratio was from 11% by mass to 36% by mass. Patchiness of the coated surface and precipitation of solid material were confirmed to be prevented in the manufacturing of cell separators by using the above conditions.

Although the preceding description has provided a detailed explanation of the present invention, the above-mentioned embodiments are merely intended to be exemplary, and various alterations and modifications of the above-mentioned specific examples are included in the invention disclosed herein. For example, the cell separator according to the present invention can be used in secondary batteries of various forms without being limited to the wound-type secondary battery described above. In addition, the size and other configurations of the separator can also be suitably modified according to the application (and typically, vehicle mounting).

INDUSTRIAL APPLICABILITY

Figure 6:
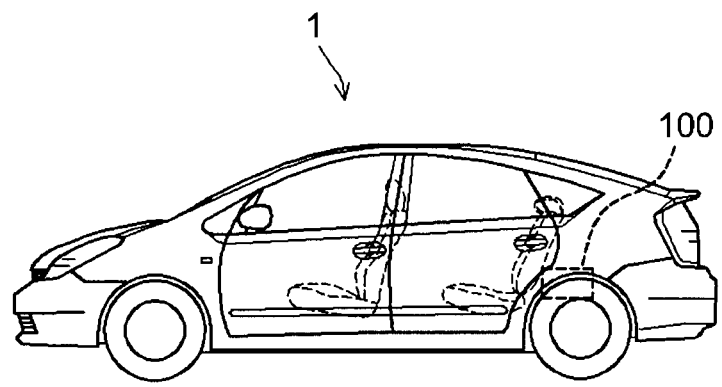
FIG. 6 is a side view schematically showing a vehicle (automobile) equipped with a lithium secondary battery according to an embodiment.

The cell separator 50 according to the present invention is provided with the protective layer 54 that is resistant to separation from a surface of the porous sheet 52 base material and has a thin and uniform layer thickness. Thus, it is capable of demonstrating quality (such as suppressing increases in internal resistance or preventing short-circuiting caused by the formation of dendrites) suitable for use as a separator for a secondary battery that is required to demonstrate high rates of charging and discharging for mounting in a vehicle as a driving source thereof. Thus, as shown in FIG. 6, a vehicle 1 (and typically, an automobile, and particularly an automobile equipped with a motor in the manner of a hybrid vehicle, electrical vehicle or fuel cell electric vehicle) can be provided that is equipped with the secondary battery 100 (which may also be in the form of a battery assembly formed by connecting a plurality of the secondary batteries in series) as a power source thereof in which the cell separator according to the present invention is provided between the positive electrode 30 and the negative electrode 40.

The invention claimed is:

1. A method of manufacturing a cell separator, the method comprising:
    providing a water-repellent porous synthetic resin film or membrane having a large number of fine pores with a pore diameter of 1 μm or less;
    preparing a water-based paste comprising
        an aqueous solvent containing at least one type of alcohol,
        at least one type of granular ceramic, and
        at least one type of binder that is soluble or dispersible in the aqueous solvent,
    wherein a solids content comprising the granular ceramic and the binder in the paste is adjusted to 44% by mass to 52% by mass, and the ratio of the alcohol contained in the aqueous solvent is adjusted to 11% by mass to 36% by mass;
    coating the paste onto a surface of the synthetic resin film membrane;
    forming a protective layer mainly composed to the granular ceramic with a solids content of at least 55% by mass on the surface of the synthetic resin film or membrane by eliminating the alcohol from the paste on the surface; and
    drying the protective layer mainly composed of the granular ceramic on the surface.

2. The manufacturing method according to claim 1, wherein the water-repellent porous synthetic resin film or membrane has a large number of fine pores with a pore diameter of several tens of nm.

3. The manufacturing method according to claim 1, wherein the alcohol is a lower alcohol that dissolves in water and is eliminated at a temperature lower than that of water.

4. The manufacturing method according to claim 1, wherein the water-based paste is coated onto a surface of the synthetic resin film or membrane by using a gravure coating method.

5. The manufacturing method according to claim 1, wherein the water-repellent porous synthetic resin film or membrane comprises a polyolefin-based synthetic resin.

6. The manufacturing method according to claim 1, wherein the ceramic is alumina particles.

7. A secondary battery comprising, between a positive electrode and a negative electrode, a cell separator manufactured by the manufacturing method according to claim 1.

8. A vehicle comprising the secondary battery according to claim 7.

* * * * *